Nov. 17, 1931.   C. R. RANEY ET AL   1,832,051
DRIVING MEANS
Filed April 6, 1927   2 Sheets-Sheet 1
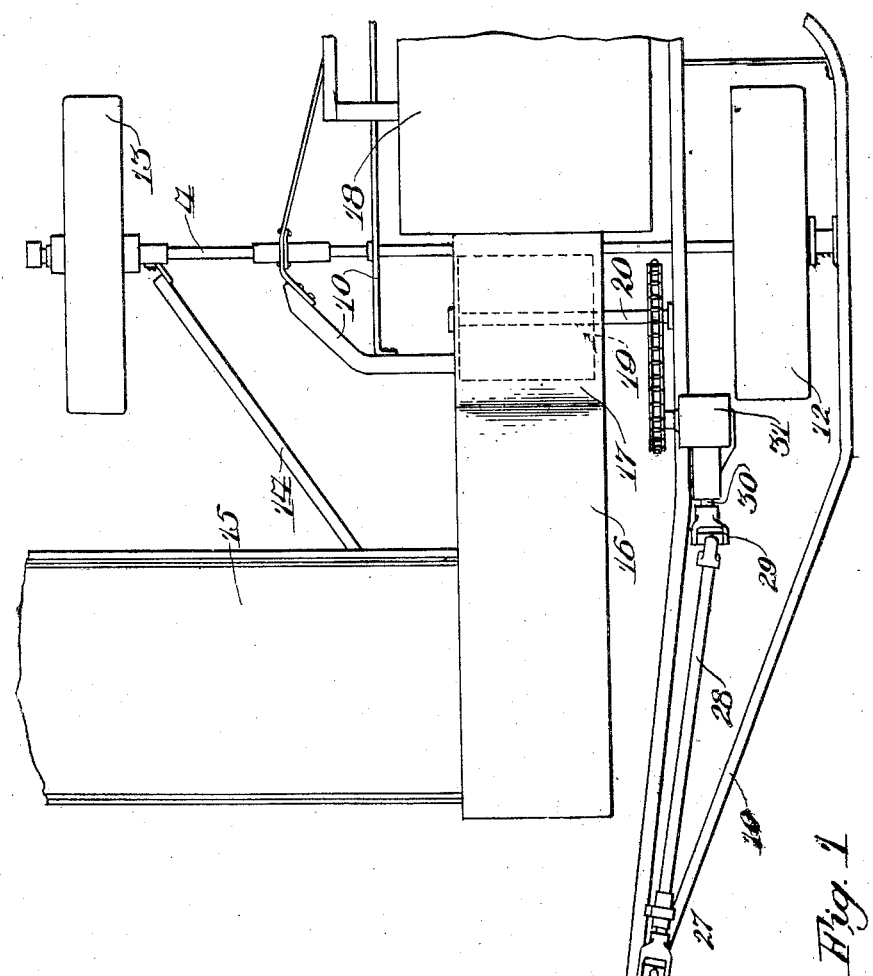
Fig. 1
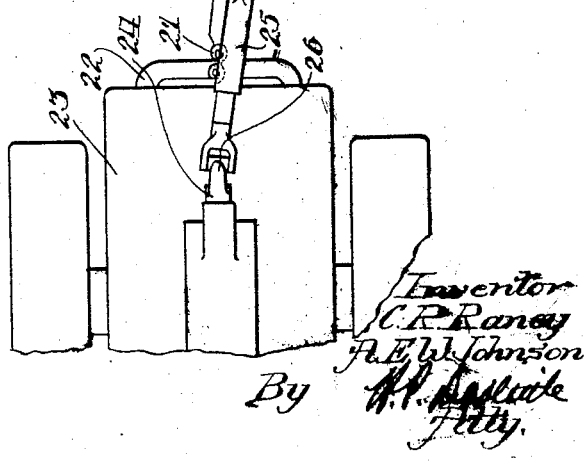

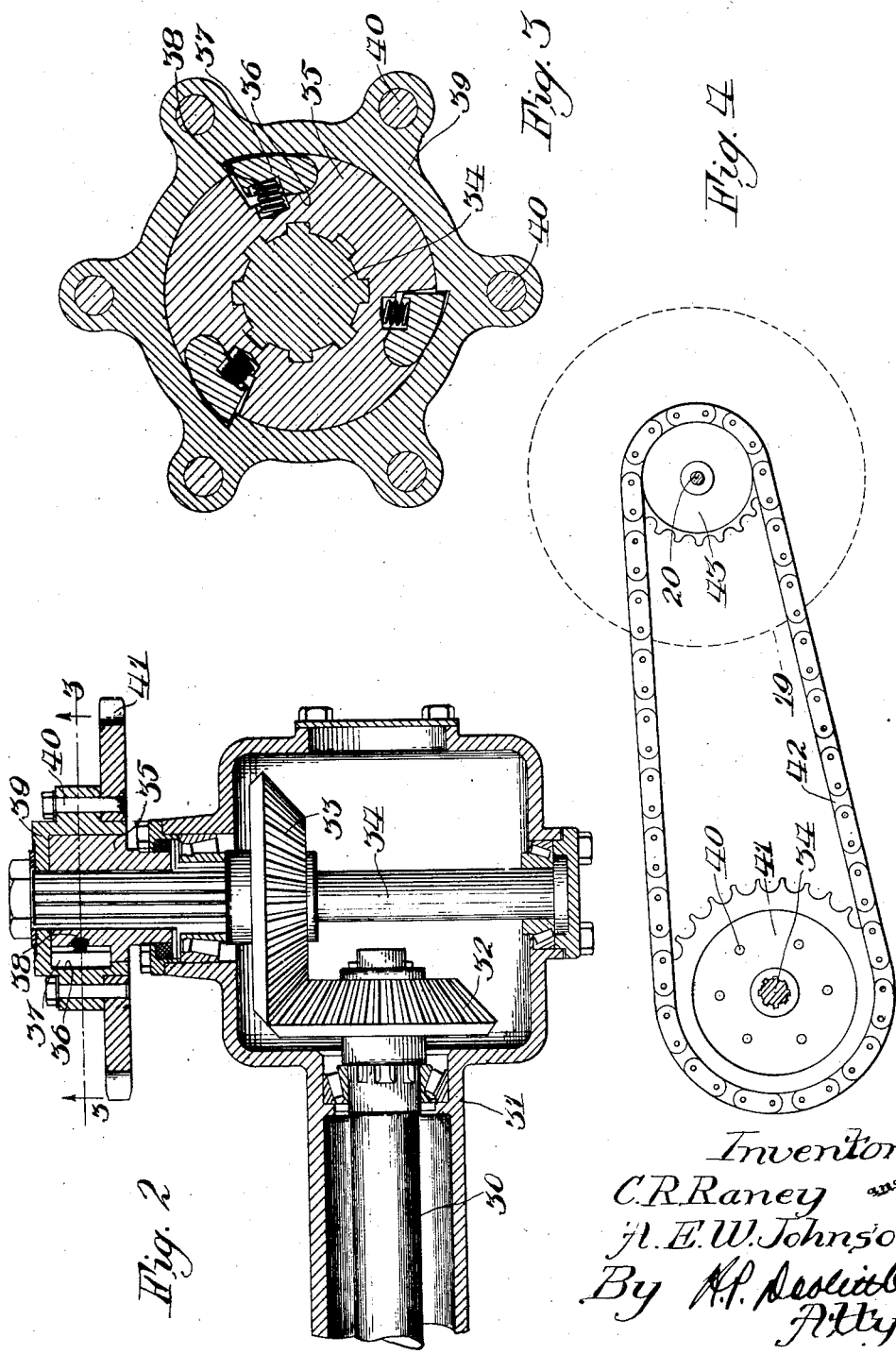

Patented Nov. 17, 1931

1,832,051

UNITED STATES PATENT OFFICE

CLEMMA R. RANEY, OF RIVERSIDE, AND ARNOLD E. W. JOHNSON, OF CHICAGO, ILLINOIS, ASSIGNORS TO INTERNATIONAL HARVESTER COMPANY, A CORPORATION OF NEW JERSEY

DRIVING MEANS

Application filed April 6, 1927. Serial No. 181,588.

Generally, this invention relates to an implement having an element to be rotated at constant speed and driven from power take-off shafting operated by a tractor, there being means for maintaining such constant speed even when the tandem is making turns.

In a preferred form the invention relates to harvester threshers and particularly to the type in which the threshing cylinder thereof is driven from shafting connected to a power take-off of a tractor which pulls the machine in practice.

The threshing cylinder of such machines, of course, operates at a high rotative speed so as to insure a thorough initial threshing operation. For the sake of efficiency in this initial threshing it is of the greatest importance that this high rotative speed of the cylinder be uniformly maintained under all conditions. Difficulty in this regard has, however, been encountered because of the character of the shafting connecting the tractor take-off and the cylinder, such shafting, of course, being provided with jointed or universal knuckle connections to provide that necessary flexibility which permits turning of the tractor drawn harvester thresher in the field. On the straight-away, these knuckles cause no trouble and transmit power uniformly thru the shafting and to the threshing cylinder. But, on the turns, when the shaft parts of the driving shafting are angularly related, it is found that the velocity ratio between two shaft parts coupled by a universal joint varies. Thus, a driven shaft part under such circumstances on one part of a single revolution is negatively accelerated and on the remaining part of that same revolution is positively accelerated. Such variation in velocity ratio causes a whipping of the chain which drives the threshing cylinder and also results in speed variations or velocity in the threshing cylinder and all parts connected therewith, thereby seriously affecting the thoroughness of the threshing opera on.

The primary object of this invention is to improve the power transmission mechanism between a tractor and a drawn implement, such as a harvester thresher, to the end that any variation in the velocity ratio taking place in such mechanism resulting from any cause whatsoever, will be effectively compensated for and permit even operation of any parts driven from the said power transmission mechanism.

Other objects of this invention will be apparent to those skilled in this art as the description thereof progresses.

Briefly, these very desirable objects are accomplished in the provision of an over running type of clutch interposed between a primary driven part of an implement, and the tractor driven, flexibly jointed, shafting driving such primary driven part.

An illustrative embodiment of the invention is shown in the accompanying sheets of drawings, wherein:

Figure 1 is a general plan view showing a tractor drawn and driven harvester thresher;

Figure 2 is a plan view, partly in section, of the gearing mechanism driven by the flexible shafting;

Figure 3 is a vertical, detail sectional view of the compensating mechanism as seen along the line 3—3 of Figure 2 in the direction of the arrows; and Figure 4 is a side elevational detail view of the chain drive for the threshing cylinder.

The implement shown for the purpose of illustrating this invention is a harvester thresher quite conventional in most respects and embodying a main, forwardly extending frame 10, supported on a main transverse axle 11, carried in a ma'n wheel 12 and a grain wheel 13. The axie carries the usual forwardly extending supplementary frame 14, which supports the laterally extending cutting and gathering platform 15, said platform communicating with a longitudinally, and stubblewardly arranged feeder housing 16. The feeder housing communicates with a cylinder housing 17 carried forwardly of a separator housing 18 which is mounted on the main frame 10, as shown. A threshing cylinder 19 is shown carried on a transverse shaft 20 passed thru the housing 17 and journaled in suitable supports mounted on the main frame, not shown. Said cylinder shaft projects thru the stubbleward side of the cylinder housing, as shown, for a purpose presently to appear.

The forward end of the harvester thresher is connected by a pivotal connection 21, to the drawbar 22 of a tractor 23, in a manner to support the front end of the harvester thresher. The tractor is of the type having a rearwardly extending power take-off shaft 24, from which the operative parts of the pulled implement are driven, as will now be described.

In a harvester thresher the primary driven part is the threshing cylinder and all remaining parts of the machine are usually then driven from the cylinder, or rather, its shaft. In the present case, this cylinder shaft is to be driven from the tractor power take-off shaft 24.

As shown in the drawings, an extensible or telescopic shaft part 25 is connected to the take-off shaft 24 by means of a universal knuckle joint 26. The shaft part 25, thru a second universal joint 27, is connected to a second shaft part 28, this latter part, however, being rigid and supported on the frame 10 in any approved manner. The rear end of this rigid shaft part 28 is then similarly connected by another universal joint 29 to a shaft part 30 journaled in a gear housing 31, (see Figures 1 and 2), carried on the main frame 10, as shown. It is to be noted that the joints 26 and 27 of this shafting are arranged fore and aft of the pivotal connection 21 of the harvester thresher to the tractor drawbar 22, and, as a result, with the telescopic shaft 25, easy turning of the outfit is permitted.

Inside the gear housing 31, the shaft part 30 has splined and pinned fast thereon a bevel gear 32, which drives a bevel pinion 33 similarly made fast on a cross stub shaft 34 journaled in said housing, said stub shaft protruding from the grainward side of the housing, as shown. This free end of the stub shaft has splined fast thereon a driving clutch part 35 formed on its surface, at intervals, with pockets 36 which pivotally receive pawls 37, normally pressed radially outwardly by means of springs 38. Surrounding this constantly moving clutch element 35 is a loose collar 39 having notches 40, there being one such notch adjacent each pawl 37 so that the pawls may drive or turn the collar 39 when the direction of rotation of the element 35 is counterclockwise, as seen in Figure 3. This collar, or loose clutch element, 39 has made fast thereto, by the bolts 40, a relatively large sprocket wheel 41, which wheel is connected by a chain 42 to a sprocket wheel 43 on the threshing cylinder shaft 20 for the purpose of driving the same, as will be understood.

In operation, when the outfit is traveling on the straight-away, the shafting driven from the tractor power take-off shaft 24, uniformly and at a constant velocity or speed of rotation, transmits power to the stub shaft 34, which shaft thru the clutch described drives the chain 42 without whipping it, thus keeping the threshing cylinder turning at a high, uniform rate of speed. When the outfit is making a turn, the uneven transmission of power thru the shafting, due to the use of the universal knuckles, is compensated for by the clutch described. It is accomplished in this manner. Let us assume that the cylinder 19 has been driven uniformly at its high rate of speed. Such speed of course, would be kept up for some time because of its inertia of motion developed, or momentum, very much as is the case of a flywheel. This, of course, would be the result of a straight-away travel of the outfit. Now, when the outfit makes a turn, the universal joints unevenly and in a jerky manner transmit the power thru the angularly related shaft parts of the cylinder, for one part of a single revolution of the parts, the speed being slow, and for the remaining part of the same revolution, the speed being fast. That is when the clutch described comes into play and compensates for such irregularity of power transmission, because the momentum of the cylinder is sufficient to permit the same to overrun the slower moving driving parts because of the construction of the clutch, in which the collar or driven part 39 is at such time permitted to overrun the driving part 35. Thus, a differential movement is possible between the driving parts and the cylinder, which enables the cylinder to keep up its speed when turns in the field, during operation, are made. This compensating mechanism also effectively overcomes the whipping action of the chain 42 heretofore described.

Thus, it is clear that the clutch drives the threshing cylinder at uniform speed, as long as such speed is transmitted from the shafting described, but the instant that such transmitted speed varies in its rate, the cylinder, because of its momentum, can overrun the driving parts to keep up its uniform speed. As soon as the shaft once more speeds up to normal, the clutch dogs 37 again come into play positively to drive the cylinder.

From the above detailed disclosure, it must now be obvious that an improved driving connection between a tractor and pulled driven implement has been provided, which meets all of the desirable objects heretofore recited, and that the same is simple, practicable, and very efficient for the purpose intended.

It is to be understood that various changes in form, construction, and arrangement from the illustrative embodiment herein shown may be resorted to by those skilled in this art, without departing from the spirit and scope of this invention, and that it is the intention to cover all such alterations as do not depart from the principles of this invention, as is indicated in the following claims.

What is claimed is:

1. The combination with a tractor having a power take-off, of an implement having a frame pivotally connected to be drawn by the tractor, a rotatable element to be driven at constant speed embodied in the implement, a stub shaft connected to drive the element, flexibly jointed shafting including universal joints carried on the frame between the take-off and the stub shaft, and a ratchet clutch between the stub shaft and element.

2. The combination with a tractor having a power take-off, of an implement having a frame pivotally connected to the tractor to be drawn thereby, a rotatable element carried on a transverse shaft embodied in said implement, flexibly jointed shafting including universal joints connected to said take-off, a cross stub shaft driven by said shafting, a driving connection from the stub shaft to the element shaft, and means in said driving connection to compensate for a varying speed between the element and flexibly jointed shafting.

3. The combination with a tractor having a power take-off shaft, of an implement pivotally connected thereto to be drawn thereby, a rotatable element to be driven at constant speed embodied in the implement, propeller shaft sections, universal joints connecting the shaft sections to each other and to the power take-off shaft, gearing driven by the propeller shaft sections, said gearing connected to drive the rotatable element, and means whereby the rotatable element may overrun the gearing driving the same to compensate for irregular transmission of power by the propeller shafting.

In testimony whereof we affix our signatures.

CLEMMA R. RANEY.
ARNOLD E. W. JOHNSON.